US007475363B1

(12) United States Patent
Yehuda et al.

(10) Patent No.: US 7,475,363 B1
(45) Date of Patent: Jan. 6, 2009

(54) METHODS AND APPARATUS FOR VIEWING NETWORK RESOURCES

(75) Inventors: Hanna Yehuda, Newton, MA (US); James M. Apple, Pascaog, RI (US)

(73) Assignee: EMC Corporation, Hopkintown, MA (US)

( * ) Notice: Subject to any disclaimer, the term of this patent is extended or adjusted under 35 U.S.C. 154(b) by 637 days.

(21) Appl. No.: 10/880,431

(22) Filed: Jun. 29, 2004

(51) Int. Cl.
*G06F 3/048* (2006.01)
*G06F 7/00* (2006.01)

(52) U.S. Cl. .................. 715/853; 715/850; 707/100; 707/101

(58) Field of Classification Search .............. 715/750, 715/850, 835, 853, 854; 707/100, 5, 101
See application file for complete search history.

(56) References Cited

U.S. PATENT DOCUMENTS 5,528,735 A * 6/1996 Strasnick et al. ............ 715/850
6,434,556 B1 * 8/2002 Levin et al. ................ 715/835
6,978,269 B1 * 12/2005 Johnson et al. ............. 707/100
2006/0184559 A1 * 8/2006 Arrouye et al. ............. 707/101

* cited by examiner

Primary Examiner—Weilun Lo
Assistant Examiner—Truc T Chuong
(74) *Attorney, Agent, or Firm*—Chapin IP Law, LLC; Barry W. Chapin, Esq.

(57) ABSTRACT

A processing device displays icons in a first region of a display screen. The icons represent managed resources associated with a storage system. The processing device receives a selection from a user of a resource identified on the display screen. Based on the selection, the processing device identifies whether resources related to the selected at one resource exceed a threshold value. In response to identifying that the resources related to the selected resource exceed a threshold value, the processing device displays filter criteria in a second region of the display screen to limit which of many resources related to the selected resource will be displayed on a display screen for viewing. Thus, the filter criteria enables input of filter parameters by the user to limit a subsequent display of resources related to the initially selected resource.

35 Claims, 9 Drawing Sheets

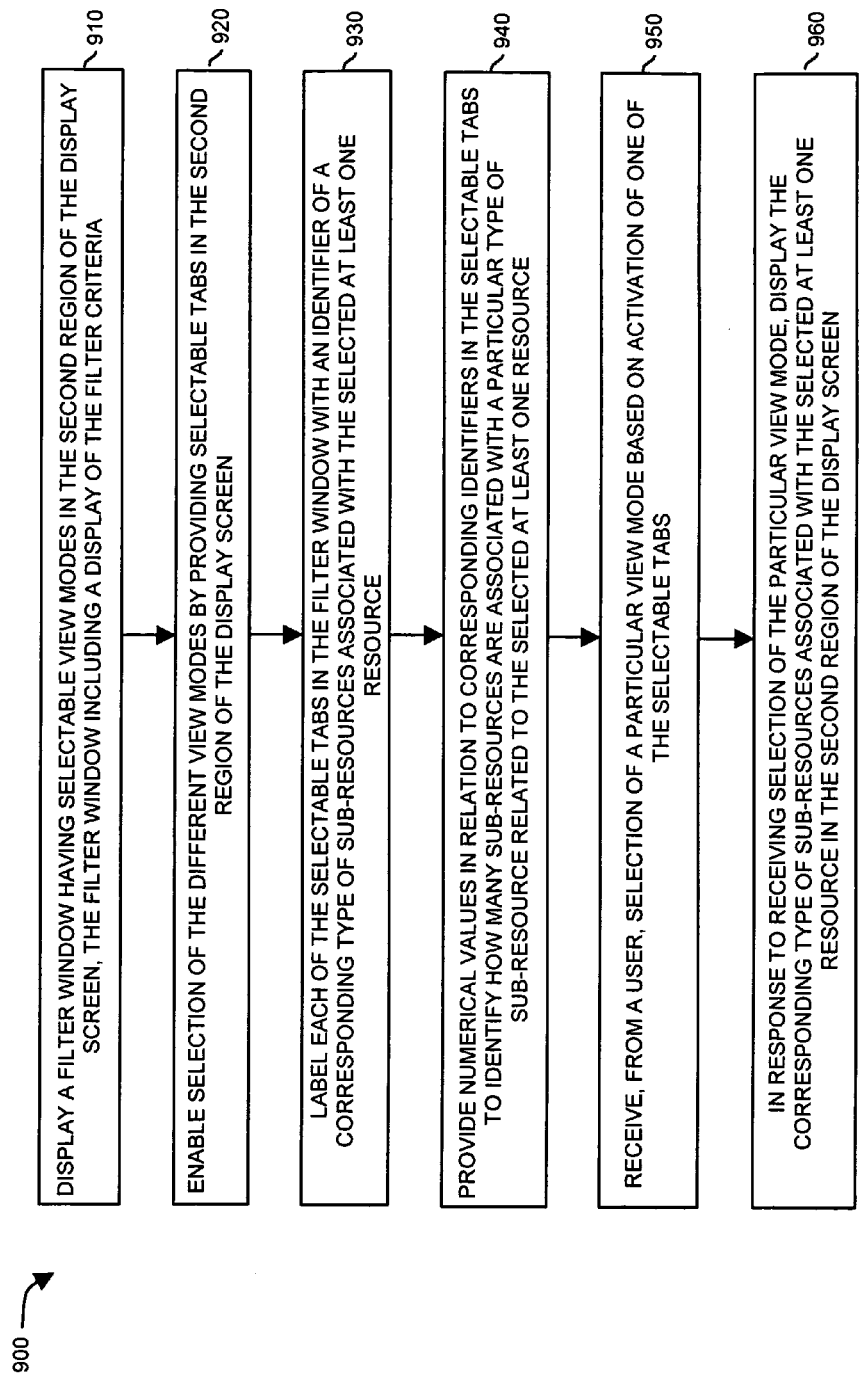

METHODS AND APPARATUS FOR VIEWING NETWORK RESOURCES

RELATED APPLICATIONS

This application is related to co-pending U.S. patent application Ser. No. 10/879,687 entitled "METHODS AND APPARATUS FOR DISPLAYING STORAGE RESOURCES," by Hanna Yehuda and James M. Apple, which is being filed on the same date as the present application. This application is also related to co-pending U.S. patent application Ser. No. 10/879,688 entitled "METHODS AND APPARATUS FOR DISPLAYING STORAGE RESOURCES," by Hanna Yehuda and James M. Apple, which is being filed on the same date as the present application. The entire teachings of both of these applications are incorporated herein by this reference.

BACKGROUND

The rapid expansion of information service and data processing industries has created a need to manage and store large amounts of data. As an example, financial service companies such as banks, mutual fund companies or the like often operate complex data processing systems that require access to many hundreds of gigabytes or even terabytes of data and files stored in remotely located, high capacity data storage systems.

Data storage system developers have responded to these types of data storage needs by integrating high capacity data storage systems, data communications devices and computer systems into networks referred to as "storage networks" or "storage area networks" (SANs.) In general, a storage area network is a collection of data storage systems that are networked with a number of host computer systems. The host computers of the storage area network operate as servers to access data stored in the data storage systems on behalf of client computers that request data from the servers.

Storage area networks are typically managed based on use of software management applications running on a corresponding network manager control station (e.g., a computer workstation) coupled to the storage area network. For example, conventional storage area network management applications (i.e., certain software applications) provide conventional graphical user interfaces (GUIs). The GUIs enable network managers to graphically manage, control and configure various types of hardware and software resources associated with a corresponding managed storage area network. For example, one conventional network management storage application generates a graphical user interface utilized by a network manager to graphically select, interact with, and manage local or remote devices and associated software processes associated with the storage area network. Based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. Typically, in such network management applications, the network manager selects a displayed icon representing a corresponding managed resource in the network and applies management commands to carry out intended management functions such as viewing hardware and software settings associated with the selected managed resource.

As noted above, a storage area network may include a number of hardware devices such as host computers, servers, data communication devices (e.g., switches, routers, etc.), network attached storage devices, proxy devices, firewall devices, and so forth that are coupled amongst each other via physical cables, circuitry, etc. Certain conventional network management applications are designed to provide a network manager with information concerning how these network resources are interrelated. For example, in one application, a network manager may select one or more icons (e.g., folders of information identifying host computers, servers, volumes, storage devices, etc.) from a hierarchical tree to display managed resources associated with a particular storage system. Based on viewing information in the hierarchical tree and/or a table of information generated based on selection of an entry in the hierarchical tree of SAN resources, the network manager can view and modify configuration settings of a corresponding managed storage area network.

SUMMARY

Conventional network management applications that support management of network resources suffer from a number of deficiencies. For example, as discussed, certain conventional network management applications enable a network manager to display a hierarchy of icons representing managed resources associated with a storage system. Based on selection of an icon (i.e., managed entity) in the hierarchy of icons, the network manager may attempt to display information on a display screen for viewing. Unfortunately, during the process of selecting, the network manager may select a particular folder in a hierarchical tree including more files or sub-folders that can be simultaneously displayed on a display screen. Of course, the network manager can scroll down the list of items in a folder to locate entries of particular interest. However, the network manager may be interested in viewing one entry in the particular folder as well as one or multiple other entries further down the list. Viewing the entries by scrolling can be cumbersome when the user otherwise wishes to compare multiple entries with each other. This problem occurs quite often when managing resources in a high capacity storage area network because a folder (i.e., a managed network resource) may contain hundreds or even thousands of entries of corresponding managed entities associated with a storage area network.

When information associated with the managed resources associated with a SAN is displayed in a scroll-down window, the network manager must potentially scroll down a very long list to find one or more desired entries. Searching for relevant entries in this way is prone to failure because a view may accidentally skip over an important entry of interest. Consequently, such conventional display techniques do not support a useful way of viewing selected information. Scrolling is especially problematic for displaying configuration information of resources associated with storage area networks or storage systems in general because, as discussed above, configuration information associated with an entry high up a scroll down list may need to be compared with configuration information associated with an entry lower in the scroll down list. Presently, there is no acceptable technique of displaying such entries in a user-friendly fashion for viewing.

Certain conventional network management applications enable a network manager to display associations among network resources in a storage area network. For example, a network manager can click on icons in a hierarchical tree to display configuration information associated with a particular managed resource in a storage system. However, such conventional network management applications do not enable a network manager to quickly and efficiently search for and display information associated with particular managed resources of interest. For example, a network manager may select a logical volume associated with a storage area network to identify how the logical volume is stored among multiple storage devices. The selected logical volume may have hundreds, thousands or more devices that comprise the logical volume. It is quite difficult for the network manager to parse through information when the number of entries to be displayed under a folder is on the order of hundreds or thousands.

Embodiments of the invention significantly overcome the aforementioned and other deficiencies of conventional network management applications. In particular, embodiments of the invention include mechanisms and techniques for managing network resources via use of a graphical user interface rendered on a computer display. In one embodiment, the graphical user interface enables a user such as a network manager to submit filter parameters to selectively limit an amount of information displayed on a viewing screen. Thus, as discussed in the above example, even though a selected class of managed network information (e.g., a folder) includes more entries than can be simultaneously displayed on a display screen, a user can identify (via submission of values for filter parameters) which information to display on the display screen rather than all information that a user has no interest in reviewing.

In a more particular embodiment of the invention, a computer device generating the GUI generates a filter window and corresponding filter criteria for a user to supply filter parameter values in response to detecting that the user selected to view more information than can be simultaneously displayed on a display screen. The GUI uses the filter parameters provided by the user in the filter window to identify a subset of the originally selected information to be displayed on a display screen for viewing by a user. In many circumstances, a user can limit the number of displayed information so that the user does not have to needlessly search through unwanted entries in an excessively long listing of sub-resources. Certain embodiments of the invention extend to network management software incorporating the functionality explained herein, as well as computerized devices configured to operate as explained herein.

Embodiments of the invention thus allow a network manager to selectively view storage system resources and corresponding sub-resources such as storage area network components configured within a storage system. The storage system components (e.g., hardware, software, configuration information, etc.) can be displayed in a tabular view including host resources (e.g., host computer, host adapters, and host adapter ports), switch resources (e.g., switches and switch ports) and storage device resources (i.e., storage system or storage array) and other resources (e.g., storage systems, storage adapters and storage adapter ports).

In view of the aforementioned embodiments, general embodiments of the invention include a technique of utilizing a processing device to display icons, in a first region of a display screen. The icons represent managed resources (e.g., volumes) associated with a storage system. The processing device receives a selection from a user of one or more resources identified on the display screen. Based on the selection, the processing device identifies whether resources related to the selected at one resource exceed a threshold. In general, the processing device achieves the step of identifying by extracting configuration information from a database to identify network resources (hardware, software, etc.) associated with a resource selected by a user for display.

In response to identifying that the resources related to the selected at one resource exceed a threshold, the processing device displays filter criteria in a second region of the display screen. The filter criteria enables input of filter parameters to limit a subsequent display of resources related to the selected one or more resources. In one embodiment, the processing device displays the filter criteria in a filter window displayed in the second region of the display screen and the filter window includes only a partial listing of resources associated with the at least one selected resource because there would otherwise be too many related resources to display on the display screen. Consequently, the user viewing the display screen can supply filter parameters (i.e., filter parameter values) to limit which resources related to the selected one or more resource the processor device displays on the display screen.

In furtherance of the aforementioned embodiment, the processor device receives values for the filter parameters to be used in a corresponding search for related resources associated with the selected one or more resources. The processor device then performs the corresponding search for the related resources based on the values for the filter parameters and thereafter displays the related resources on the display screen. This overall process of automatically displaying the filter criteria in the filter window, especially when the number of resources selected to be displayed exceeds a threshold, alleviates the user from having to making the same determination by scrolling through an entire list of managed resources to identify which are important for viewing by the user.

In further overlapping embodiments and potentially other independent embodiments of the invention, the processor device provides a vertical hierarchy of expandable icons in the first region of the display screen. At least one of the expandable icons in the vertical hierarchy represents a storage resource having an associated number of related resources that exceeds the threshold for displaying. Thus, the related resources cannot be practically displayed on the display screen for a user to view simultaneously as discussed. Based on input such as clicking on a corresponding icon associated with a managed resource, the processor device receives a selection of a particular icon having an associated number of related resources that exceeds the threshold. In a second region of the display screen, the processor displays a portion of resources associated with the particular selected icon. For example, the processor device provides a table of columns and rows to display resource information associated with the particular selected icon. The columns of the table display different types of status or configuration information associated with a corresponding resource entry in a row of the table. Thus, a user can view a particular resource entry in a column of the table and scan across a row of the table to view corresponding information associated with the particular resource entry. In a further more particular application, the processor device displays a resource entry in a row of the table as an expandable icon that, when clicked upon, produces a further view of additional resource information below a corresponding selected icon in the row of the table. In other words, a column of the table can include a set of expandable icons similar in some respects to the vertical hierarchy of icons in the first region of the display screen.

Another embodiment of the invention involves use of one or more non-expandable icons (e.g., an icon in the first region of the display screen that represents a folder of information that does not lend itself to viewing in the first region of the display screen) in the hierarchy of icons in the first region of the display screen. Selection of the non-expandable icon prompts the processor device to display sub-resources associated with the non-expandable icon in the second region of the display screen rather than beneath the selected non-expandable icon in the hierarchy of icons in the first region of the display screen. Thus, an embodiment of the invention is directed towards a processor device that displays at least one non-expandable icon in a hierarchy of icons in the first region of the display screen, the at least one non-expandable icon in the hierarchy of icons representing a resource in the storage system having other associated sub-resources that are not displayable beneath the non-expandable icon in the first region of the display screen. Thus, a user can view sub-resources associated with a selected resource in a different window than the originally selected resource. This renders it easier to view the sub-resources that would otherwise be difficult to view beneath a selected icon in the hierarchical tree in the first region of the display.

Based on input from a user, the processor device receives a selection of a particular non-expandable icon in the first region of the display region. In response to receiving the selection of the non-expandable icon, the processor device displays the sub-resources associated with the non-expandable icon in the second region of the display screen instead of under the particular non-expandable icon in the first region. For example, the processor device displays a hierarchy of the sub-resources associated with the particular non-expandable icon beneath the filter criteria in the second region of the display screen. In some respects, therefore, the non-expandable icon is not locally expanded but is "expanded" remotely via generation of a table of information in another window on the display screen when the non-expandable icon is selected.

According to another embodiment of the invention, the processor device displays a filter window having selectable view modes in the second region of the display screen. The filter window includes a display of filter criteria for limiting a view of displayed resources as discussed above as well as icons to select different view modes. Each of the selectable view modes of the filter window, when selected for viewing, includes different search parameters for performing searches depending on which of the selectable view modes has been selected by a user.

In one embodiment, the processor device enables selection of the different view modes by providing selectable tabs (e.g., in a horizontal manner) in relation to (e.g., above the filter criteria) the filter window in the second region of the display screen. Based on input from a user, the processor device receives selection of a particular view mode of the filter window. Each of the different view modes may correspond to a particular type of resource associated with the selected one or more resources. For example, a first view mode may be selected based on selection of a first icon and corresponding type of resource to be viewed; a second view mode may be selected based on selection of a second icon and corresponding type of resource to be viewed, and so on. Based on the selected view mode, the processor displays the filter window to include search parameters associated with the particular type of resource associated with the selected view mode. The user then provides values for the search parameters in the filter window for the particular selected view mode. The processor device receives the values for the search parameters in the filter window to perform a search and identify related resources associated with the selected one or more resources. After performing a search based on values of the search parameters in the filter window, the processor device displays the related resources from the search on the display screen for viewing by the user. Providing different view modes enables a user to quickly provide parameter values to be used in a corresponding search.

According to yet another embodiment of the invention, the processor device displays a filter window having selectable view modes in the second region of the display screen. The filter window includes a display of the filter criteria for a user to submit values to be used in a search. The processor enables selection of the different view modes (associated with the filter window) by providing selectable tabs (i.e., selectable icons) in the second region of the display screen. In one embodiment, the selectable tabs are disposed horizontally above the search parameters.

The processor generating the filter window and corresponding selectable tabs labels each of the selectable tabs in the filter window with an identifier. The identifier of a tab identifies a corresponding type of sub-resource associated with the selected one or more resources. Thus, presentation of the selectable tabs enables a user to further narrow which type of sub-resource associated with an initially selected resource in the first region of the display screen shall be expanded for viewing.

In addition to labeling the selectable tabs, according to one embodiment, the processor provides numerical values in relation to corresponding identifiers in the selectable tabs to identify how many sub-resources are associated with a particular type of sub-resource related to the selected one or more resources. Consequently, a user can quickly review the numerical values displayed on the selectable tabs to identify how many sub-resources are associated with corresponding types of resources also identified by the selectable tabs. As discussed, the processor receives, from a user, selection of a particular view mode based on activation of one of the selectable tabs. In response to receiving selection of the particular view mode, the processor device displays the corresponding type of sub-resources associated with the selected one or more resources in the second region of the display screen.

As discussed, techniques of the invention are well suited for use in applications in which a network manager or user manages a storage area network including many managed resources that are not easily displayed in an expandable hierarchical tree. However, it should be noted that embodiments of the invention are not limited to use in such applications and, thus, embodiments of the invention are well suited for other applications as well.

Other embodiments of the invention include a computerized device (e.g., a host computer, workstation, etc.) configured to support the aforementioned method operations disclosed herein as embodiments of the invention to provide filtering and viewing capability as discussed. In such embodiments, the computerized device includes a display, a memory system, a processor (e.g., a processing device) and an interconnect. The interconnect supports communications among the display, the processor and the memory system. The memory system is encoded with a resource management application that, when executed on the processor, produces a resource management process that includes a graphical user interface produced on the display of the computerized device. The graphical user interface allows the resource management process to perform any of the method embodiments and operations explained herein.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation and display of filter views and associated operations as explained herein.

The computer program logic, when executed on one or more processor devices or logic devices in a computing system, causes the devices to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One more particular embodiment of the invention is directed to a computer program product that includes a computer readable medium having instructions stored thereon for supporting management of network resources. The instructions, when carried out by a processor of the first data communication device, cause the processor to perform the steps of: i) in a first region of the display screen, displaying icons representing resources in the storage system; ii) receiving a selection of at least one resource identified on the display screen; iii) identifying that resources related to the selected at least one resource exceed a threshold; and iv) in response to identifying, displaying filter criteria in a second region of the display screen, the filter criteria enabling input of filter parameters to limit a subsequent display of resources related to the selected at least one resource. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 9 is flowchart illustrating a more detailed technique for viewing network resources according to an embodiment of the invention.

DETAILED DESCRIPTION OF PREFERRED EMBODIMENTS

According to one embodiment of the invention, a processing device display icons in a first region of a display screen. The icons represent managed resources associated with a storage system. The processing device receives a selection from a user of resources identified on the display screen. Based on the selection, the processing device identifies whether resources related to the selected at one resource exceed a threshold. In response to identifying that the resources related to the selected resource exceed a threshold, the processing device displays filter criteria in a second region of the display screen to limit which of the resources related to the selected resource will be displayed for viewing. In general, the filter criteria enables input of filter parameters to limit a subsequent display of resources related to the selected one or more resources.

In one embodiment, the processing device displays the filter criteria in a filter window displayed in the second region of the display screen. The filter window may include only a partial listing of resources associated with the at least one selected resource when there would otherwise be too many related resources to display on the display screen. In addition, embodiments of the invention include an advanced filter function to filter by any resource associated with the system. Consequently, the user viewing the display screen can supply filter parameters to limit which resources related to the selected one or more resource the processor device displays on the display screen. Other embodiments of the invention will be discussed in more detail with reference to corresponding figures.

Figure 1:
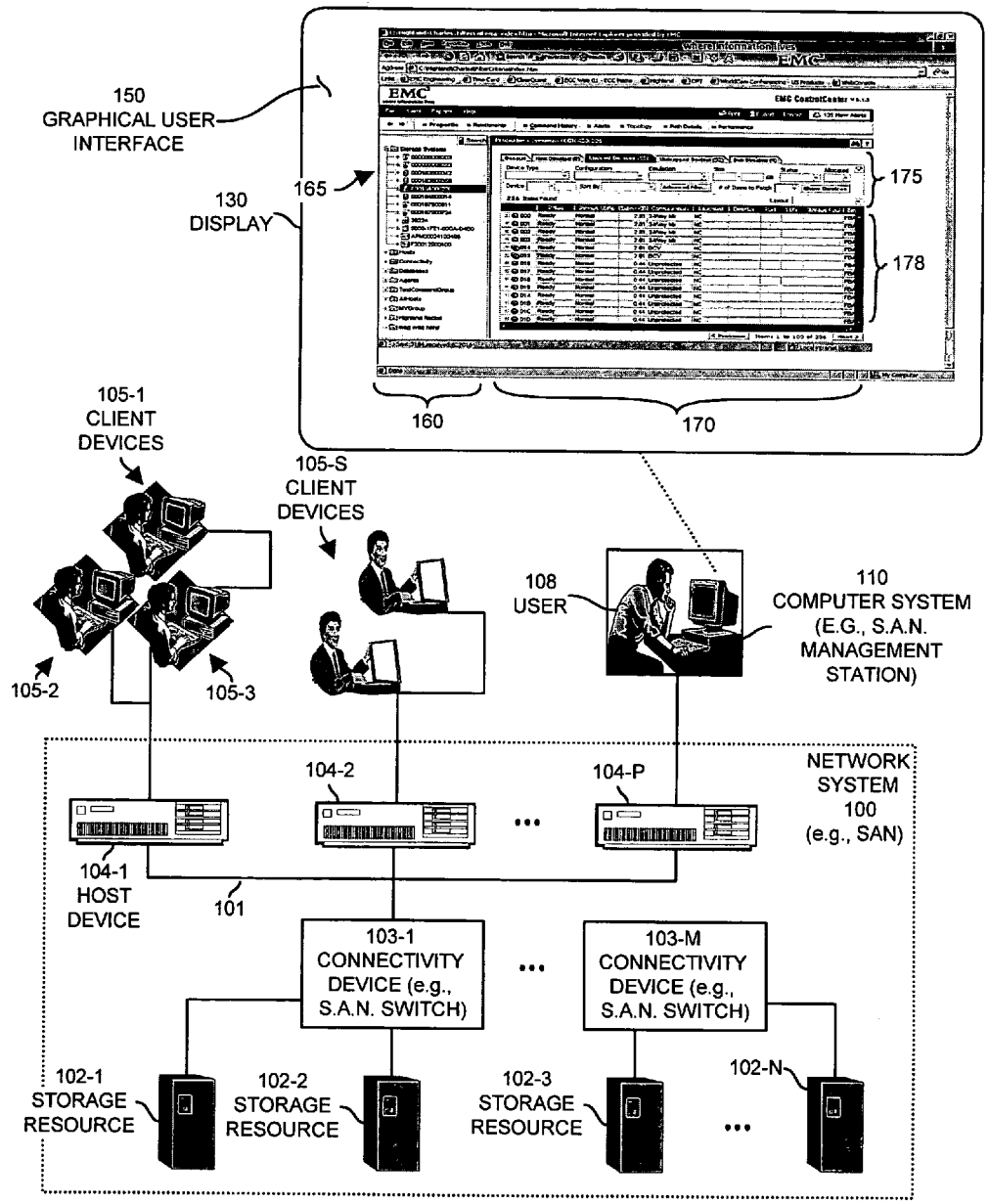
FIG. 1 is a block diagram of a storage area network and management station configured to operate according to an embodiment of the invention.

FIG. 1 illustrates a network system 100 (e.g., a storage area network) suitable for explaining operations of example embodiments of the invention. As shown, the network system 100 includes a network medium 101 such as a high-speed data communications medium (e.g., Ethernet, optical network, or other type of network) that interconnects a plurality of components such as storage resources 102-1, 102-2, ... 102-N, storage area network switches 103-1, ..., 103-M, host devices (e.g., host servers) 104-1, 104-2, ..., 104-P, client devices 105-1, 105-2, ..., 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager application 120 (e.g., a software graphical user interface application more particularly shown in FIG. 2) that generates and displays information in accordance with embodiments of the invention as will be explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) which resource manager 120 controls to display a graphical user interface 150 as explained herein. User 108 provides input commands to control what information (e.g., tables, pop-up screens, etc.) is displayed on display 130.

The graphical user interface 150 configured in accordance with embodiments of the invention includes a first region 160 and a second region 170 on display 130. The first display region 160 includes a hierarchical arrangement of icons 165 (e.g., a hierarchy of vertically disposed icons). The second display region 170 includes filter window 175 and table 178. Display region 170 includes configuration information (e.g., VSANs, zones, volumes, etc.) associated with network system 100. Icons 165 illustrated on display 130 represent managed hardware and software entities associated with network 100. As will be explained in more detail shortly, the graphical user interface 150 enables a user 108 of the computer system 110 to select one or more icons (e.g. host resources) from the hierarchical arrangement of icons 165 displayed on the left side of display 130 for purposes of displaying configuration information in table 178 including elements or resources associated with the selected one or more icons in the first display region 160. Filter window 175 enables user 108 to supply filter parameters and limit an amount of information displayed in table 178. In other words, user 108 can use the filter window 175 to selectively display resource information in table 178, which is related to the selected icon from hierarchical arrangement of icons 165.

Figure 2:
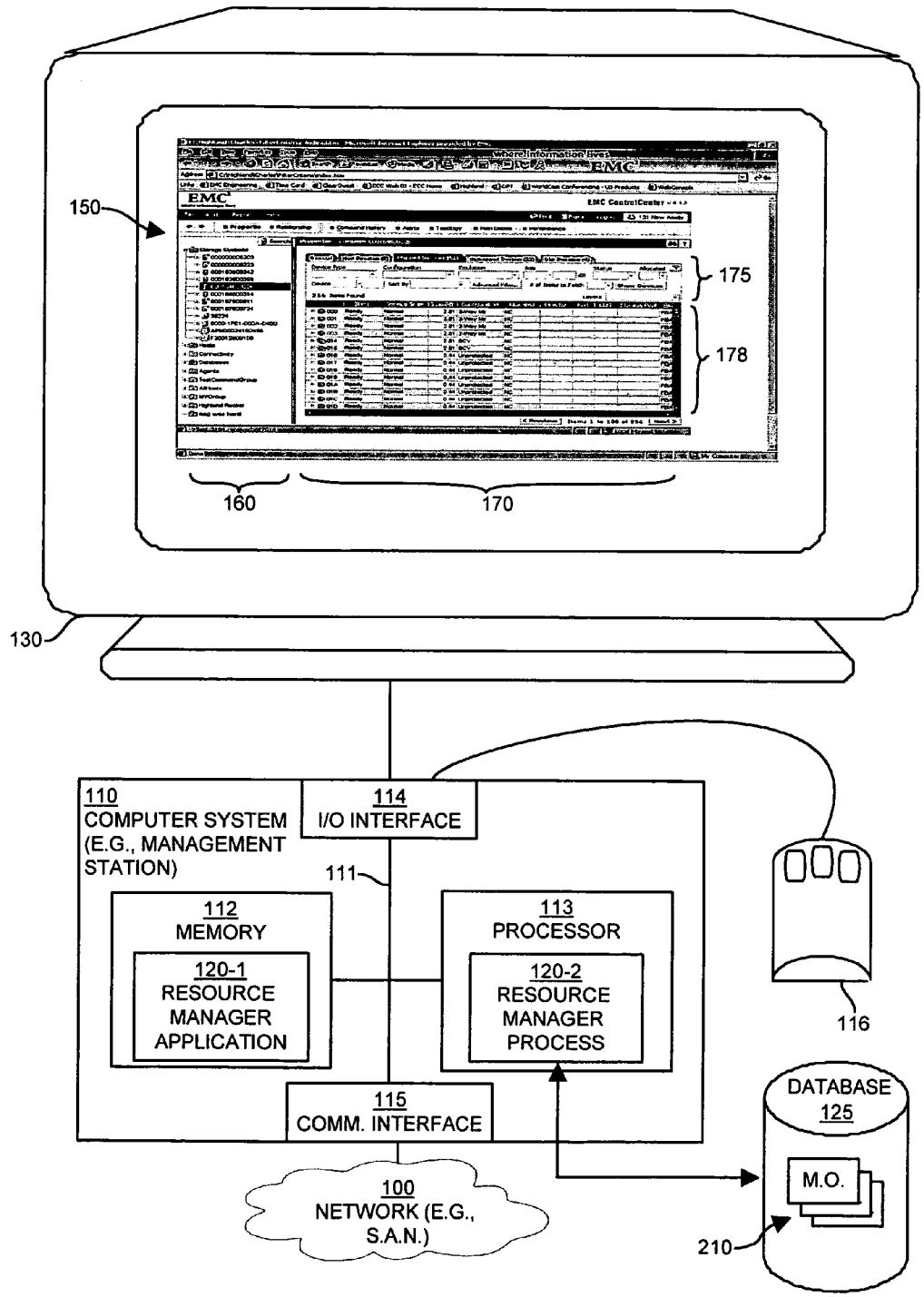
FIG. 2 is a block diagram of a processing device suited for executing techniques according to an embodiment of the invention

FIG. 2 is a block diagram illustrating an example architecture of a computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Database 125 stores managed objects 210 associated with managed entities (e.g., hardware and software resources, configurations, etc. associated with host devices 104, storage resources 102, etc.) in network system 100. Communications interface 115 enables computer system 110 (and corresponding user 108) to communicate with other devices (i.e., resources) associated with network 100.

As shown, memory 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing the various steps and functional operations to carry out the features of embodiments of the invention.

It should be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory such as firmware, read only memory (ROM), or, as in this example, as executable code within the memory system 112 (e.g., within Random Access Memory).

In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as a computer operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely. In an application, GUI 150 is a browser on a computer supported via use of the XML protocol.

To generate displayed information in graphical user interface 150, the host computer system 110 (e.g., the resource manager process 120-2) extracts information from managed objects 210 stored in database 125. For example, in one embodiment, the resource manager 120 receives an identity of at least one selected network resource (e.g., a volume) associated with the storage area network. Based on the selected network resource, the resource manager 120 extracts information associated with the managed objects 210 associated with the selected network resource as well as other related managed objects 210 from management database 125. The managed objects 210 store information identifying their relationships with other managed objects.

As mentioned, graphical user interface 150 generated by resource manager 120 provides user 108 the ability to selectively display information associated with a storage system such as a storage area network. For example, based on processing of retrieved information from database 125, the resource manager 120 provides a view (in table 178) of subresources associated with a selected one or more resource identified in the first display region 160.

In one embodiment, computer system 110 extracts information from database 125 using SQL (Structured Query Language) and stores the information in data structures for processing. For example, database 125 contains managed objects 210 (e.g., database records, tables, data structures, etc.) associated with various hardware and software resources or entities associated with network system 100. Computer system 110 utilizes information in the managed objects 210 to identify what resources are related to a selected one or more managed resource in the hierarchy of icons 165. In one embodiment, computer system 110 retrieves information from a server coupled to database 125.

As discussed, database 125 includes managed objects 210 corresponding to network resources in network system 100. More details regarding potential information stored in managed objects 210 will be discussed in connection with FIG. 3.

Figure 3:
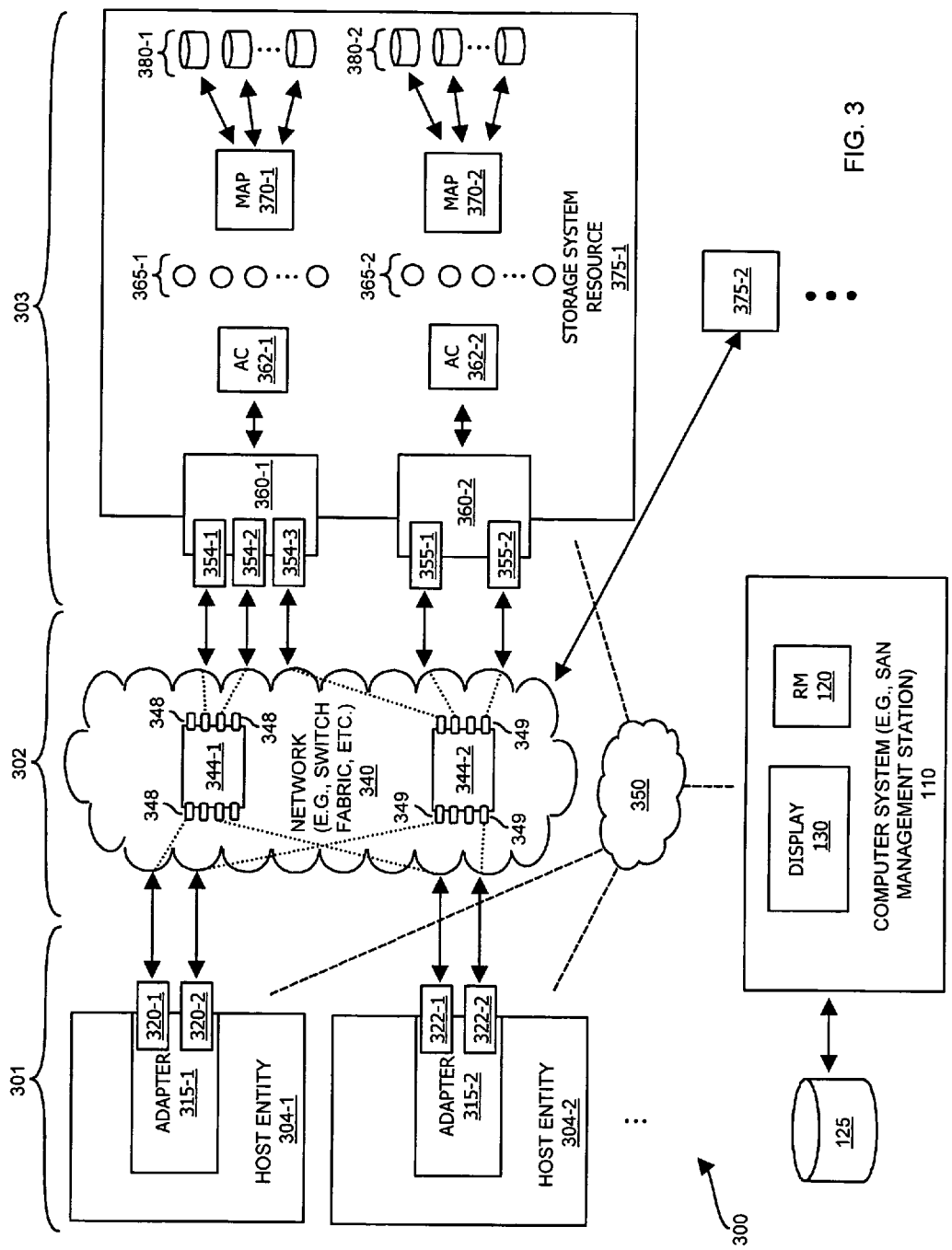
FIG. 3 is a block diagram illustrating a relationship between host resources, switch resources, and storage resources according to an embodiment of the invention.

FIG. 3 is a block diagram illustrating connectivity of network resources (e.g., host resources 301, switch resources 302, and storage resources 303) in a storage area network 300 according to an embodiment of the invention. Note that storage area network 300 can include hundreds or thousands of resources of a particular type due to a potentially enormous size and complexity of such a system.

As shown, storage area network 300 includes host entity 304-1 and host entity 304-2 (collectively, host entities 304), network 340 (e.g., a high speed fiber based switch fabric), network 350 (e.g., LAN, WAN, Internet, intranet, etc.), storage system resource 375-1, storage system resource 375-2, computer system 110, and database 125. Network 340 includes switch device 344-1, switch device 344-2 and corresponding switch ports 348 and 349. Host entity 304-1 includes adapter 315-1 and corresponding port 320-1 and port 320-2 to communicate over network 340. Similarly, host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

As discussed, client devices 105 couple to corresponding host entities 304-1, which retrieve information on behalf of the client devices 105. Storage area network 300 enables host entities 304 (e.g., clients, host computers, etc.) access to storage system resources 375 via network 340. For example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a connection path between host entities 304 and corresponding storage system resources 375. Based on the aforementioned storage system topology, clients 105 are able to access storage system resources through corresponding host entities 304.

Storage system resource 375-1 includes access controllers 362 to facilitate access to corresponding storage devices 365 (e.g., logical storage space in a storage system). Storage devices 365 are configured as logical portions of one or more physical storage devices 380 (e.g., arrays of storage disks). Maps 370 provide a mapping of storage devices 365 (e.g., that combined form a logical volume or a portion of a logical volume) to corresponding physical storage devices 380.

Each host entity 304 is typically limited to accessing certain storage devices 365 in storage system resource 375-1 based at least in part on configuration settings of switch devices 344 of network 340. In one embodiment, each of switch ports 348 and 349 are assigned to support a particular SAN in network 340. Host entities 304 associated with the particular SAN access storage system resources 375 via routing through switch devices 344.

Figure 4:
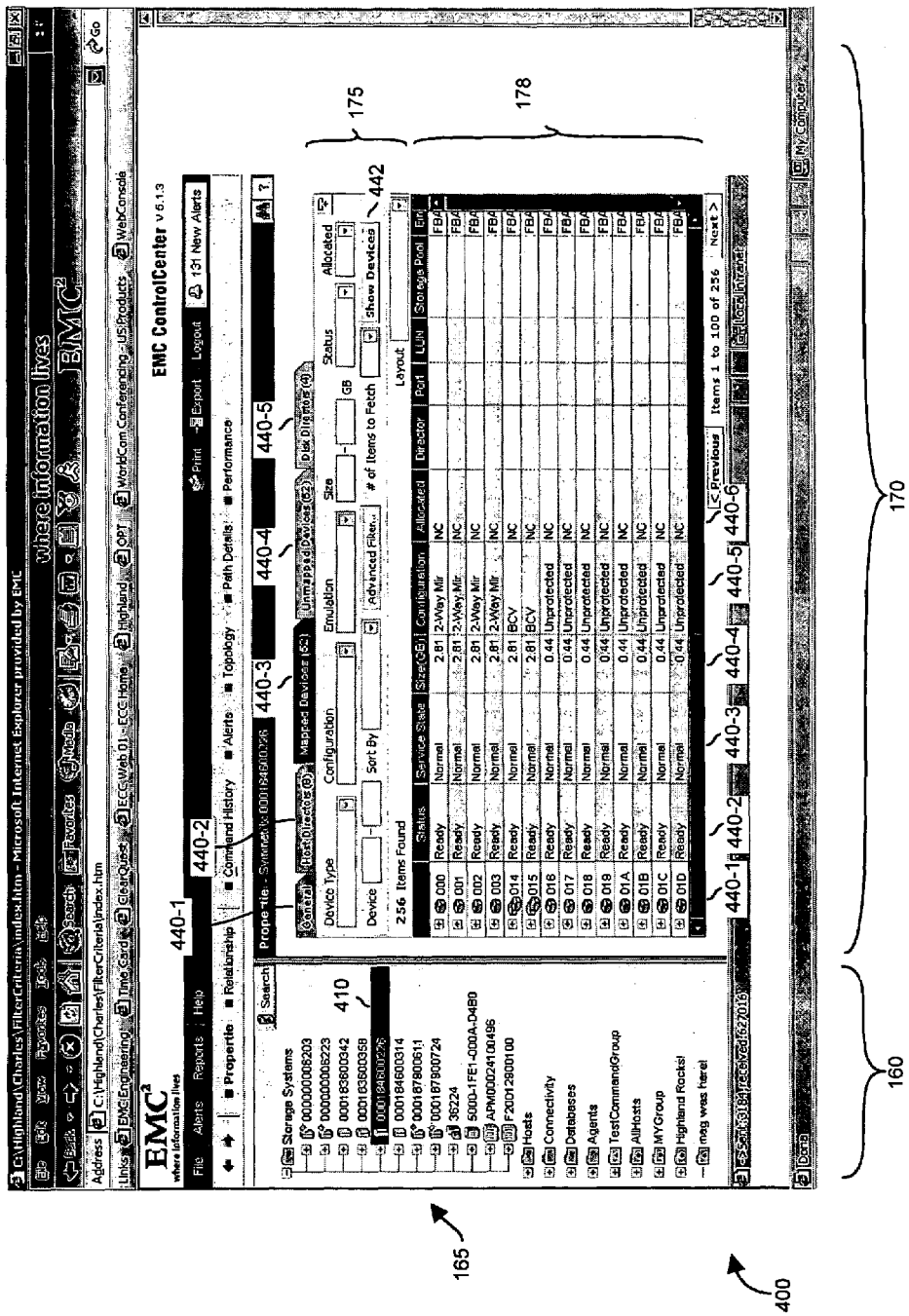
FIG. 4 is a screenshot of a graphical user interface according to an embodiment of the invention.

FIG. 4 is a screenshot 400 on display 130 according to an embodiment of the invention. As shown, first display region 160 of screenshot 400 includes a hierarchy of icons 165 representing managed objects 210 (e.g., hardware and/or software resources) associated with storage area network 300. During operation, user 108 clicks on corresponding icons in the hierarchy of icons 165 to expand or minimize different folders of resources. Note that in the example shown, the highlighted icon 410 (i.e., storage system 000184600226) may be expanded in first display region 160. However, selection (e.g., clicking on a an appropriate icon by user 108) of icon 410 prompts display 130 to generate filter window 175 and corresponding table 178 in the second display region 170 of screenshot 400.

Table 178 in second region 170 of display 130 includes rows 430 and columns 440 of information associated with the highlighted icon 410. The displayed information varies depending on which of multiple viewing modes is selected by user 108 via selectable tabs 420. In the example shown, user has selected tab 420-3 (mapped devices). Consequently, table 178 in the second display region 170 includes "mapped devices" information (e.g., disk space allocated for use by a particular volume) associated with highlighted icon 410. Filter window 175 includes filter criteria enabling a user 108 to reduce (or "filter out") which mapped devices (e.g., 000, 001, 002, 003, 014, . . . ) are displayed in table 178. For example, user can supply filter parameter values into data fields dedicated for device type, configuration, emulation, size, status, allocated, etc. As shown in example screenshot 400, filter window 175 further enables user 108 to select devices within a particular range as well as display the entries in table 178 (via the "sort by" function) according to a particular display rule selected by user 108. After user 108 provides all or a portion of the filter parameters in appropriate data fields, user 108 executes the filter feature by clicking on the show devices icon 442. In response to application of the filter rules provided by user 108 in filter window 175, GUI 150 updates the table 178 to include only those entries (e.g., mapped devices) that fall within the filter parameters.

Note that the number of mapped devices (e.g., 256) associated with storage system 000184600226 exceeded an amount that could be displayed at the same time in table 178. Consequently, GUI 150 generates filter window 175. Use of filter window 175 enables user 108 to more easily view entries without having to scroll down and view each of 256 entries. In certain embodiments, a more complex storage system may include many thousands of mapped devices. Scrolling through and searching for particular entries of mapped devices in the table 178 would present a heavy burden on the user. Use of the filter window 175 according to embodiments of the invention alleviates this burden because the filter enables a user to quickly locate entries of interest by submission of filter parameters.

As discussed, table 178 includes rows 430 and columns 440 to display information related to the highlighted icon 410 to user 108. For example, mapped device 000 in row 430-1 has: i) a status=ready as indicated in column 440-2, ii) service state=normal as indicated in column 440-3, iii) a size=2.81 Gigabits as indicated in column 440-4, iv) a configuration=unprotected as indicated in column 440-5, etc. Note that the filter window 175 enables user 108 to selectively view entries based on corresponding parameters shown in column 440. For example, filter window 175 enables user 108 to selectively display entries based on parameters such as status (column 440-2), size (column 440-4), configuration (column 440-5), etc. as shown below in table 178.

In the example screenshot 410, several columns (e.g., director, port, LUN, etc.) do not include any displayed information. No information is displayed in these fields because such fields are not relevant to the entry shown in the row. However, note that entries for mapped devices in column 440-1 can be expanded via a corresponding + sign. When such an entry is expanded, related resources associated with the expanded entry appear below the expanded entry in corresponding newly inserted rows in table 178. For the newly inserted one or more rows, the appropriate columns 440 are then filled in with information associated with the listed resource at the head of the row. Thus, according to one embodiment, table 178 includes a hierarchical tree of expandable resources. Use of the filter window 175 enables user 108 to reduce the number of resource entities displayed for a particular selected folder and, thereafter, expand any of the remaining displayed resource entities in table 178.

In one embodiment, icons in hierarchy of icons 165 are not expandable in the first display region 160 even though such icons have associated sub-resources that otherwise could be displayed beneath an expanded icon. For example, in one embodiment, hierarchical icon 410 does not include a + sign to support expansion. In this instance of the invention, the user 108 could still select and highlight icon 410. However, expansion of related resources associated with icon 410 is provided in a different viewing region such as table 178 in the second display region 170. One purpose of forcing a user to expand such a folder in the second display region 170 is storage system complexity. The first display region 160 may not lend itself to displaying many sub-resources associated with a selected storage system resource (e.g., highlighted icon 410) nor may it support the filter features as discussed above.

In one embodiment, filter window includes selectable tabs 420 (i.e., icons) that enable a user 108 to select which type of sub-resources shall be displayed for the highlighted icon 410 in the first display region 160. For example, selectable tab 420-1 enables user 108 to selectively view general resources associated with highlighted icon 410, selectable tab 420-2 enables user 108 to selectively view host director resources associated with highlighted icon 410, selectable tab 420-3 (as shown) enables user 108 to selectively view mapped device resources associated with highlighted icon 410, selectable tab 420-4 enables user 108 to selectively view unmapped device resources associated with highlighted icon 410, selectable tab 420-5 enables user 108 to selectively view disk director resources associated with highlighted icon 410, and so on. Note that selectable tabs 420 include associated numerical values indicating to the user 108 how many resources of a particular type (as indicated by the corresponding selectable tab 420) are associated with the highlighted icon 410.

Depending on which selectable tab 420 has been selected by user 108, filter window 175 may include different filter criteria. For example, selection of tab 420-3 prompts a display of filter criteria shown in filter window 175. Different filter criteria may be presented to a user when selecting another selectable tab such as selectable tab 4204 disk directors. Automatically displaying the appropriate filter criteria to a user 108 depending on which tab 420 has been selected simplifies and speeds up a task of performing further searching and viewing functions for the user 108.

General functionality supported by computer system 110 according to embodiments of the invention will now be discussed with respect to flowchart 500 in FIG. 5 as briefly discussed above with respect to FIGS. 1 through 4 above. Note that FIGS. 6-9 include more particular, but related embodiments of the invention. There will be occasional overlap with respect to concepts discussed in the figures.

Figure 5:
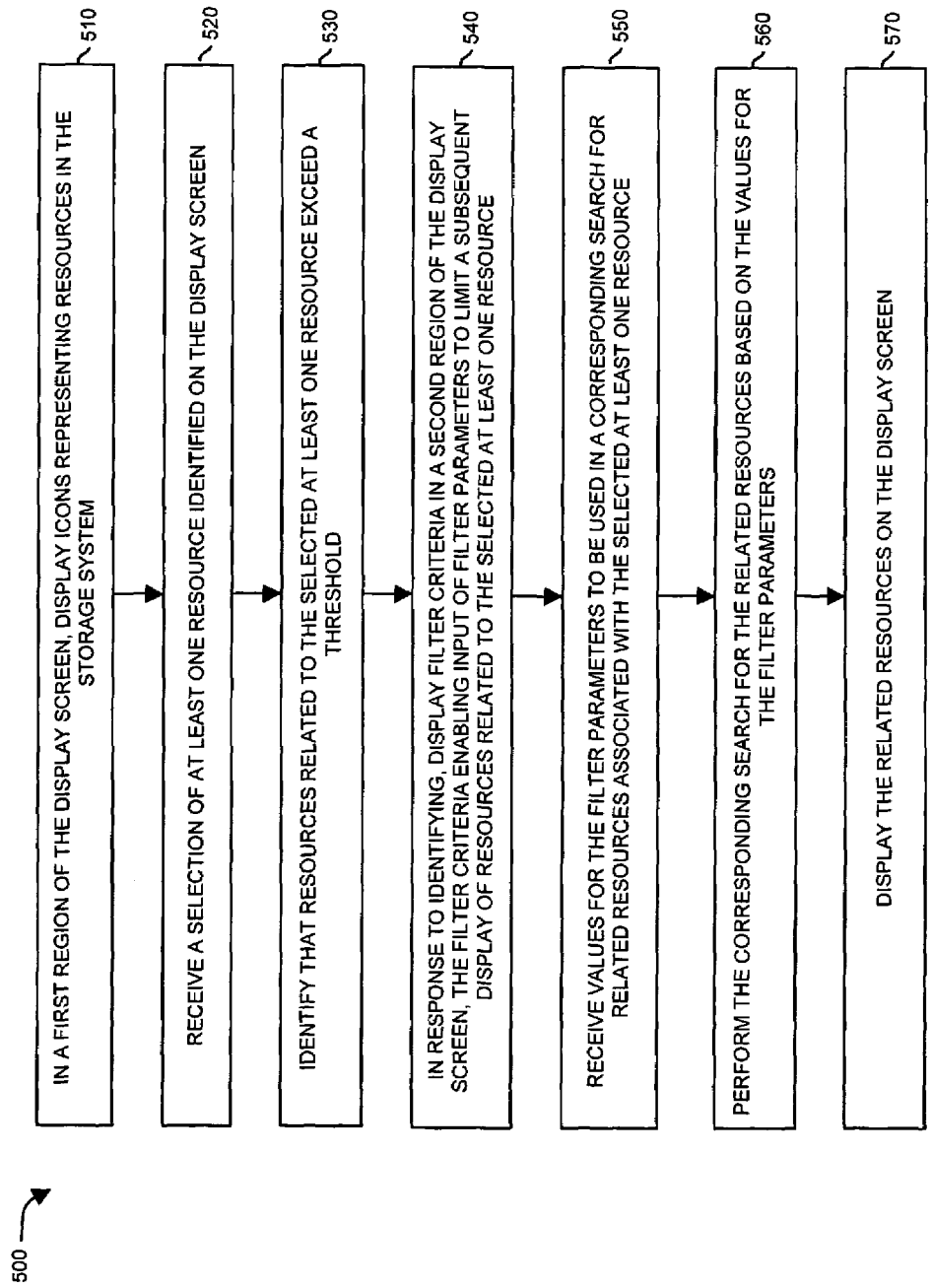
FIG. 5 is a flowchart illustrating a general technique for viewing network resources according to an embodiment of the invention.

FIG. 5 is a flowchart 500 of processing steps performed by resource manager 120 according to an embodiment of the invention. In general, flowchart 500 illustrates how resource manager 120 enables user 108 of the management station computer system 110 to selectively display information associated with storage area network 300. Note that the discussion of FIG. 5 will include occasional references to techniques and features discussed in the previous figures. For illustrative purposes, processor 113 in computer system 110 in FIG. 2 performs the following operations. However, embodiments of the invention cover the general concepts as recited in the flowcharts, which may be performed by entities other than processor 113.

In view of the aforementioned embodiments, the following embodiments of the invention as shown in flowchart 500 involve a technique of providing a filtering function to enable a user 108 to selectively view resources on display 130.

In step 510, processor 113 displays icons in a first region of a display screen. The icons represent managed resources (e.g., a specific Symmetrix™ storage system) associated with a SAN.

In step 520, processor 113 receives a selection (via selection of icon 410) from a user 108 of one or more resources identified on the display screen 130.

In step 530, processor 113 identifies whether resources related to the selected at one resource (e.g., highlighted icon 410) exceed a threshold. In general, the processing device achieves the step of identifying by extracting configuration information from a database to identify network resources (e.g., hardware resources, software resources, etc.) associated with a resource selected by a user for display.

In step 540, in response to identifying that the resources related to the selected at one resource exceed a threshold, the processing device 113 displays filter criteria in a second region 170 of the display screen 130. The filter criteria enables input of filter parameters by user 108 to limit a subsequent display of resources related to the selected one or more resources. In one embodiment, the processing device 113 displays the filter criteria in a filter window 175 displayed in the second region 170 of the display screen 130 and the filter window 175 includes only a partial listing of resources associated with the at least one selected resource because there would otherwise be too many related resources to display on the display screen 130. Consequently, the user 108 viewing the display screen 130 can supply filter parameters (i.e., filter parameter values) to limit which resources related to the selected one or more resource the processor device 113 displays on the display screen 130.

In step 550, the processor device 113 receives values for the filter parameters in filter window 175 to be used in a corresponding search for related resources associated with the selected one or more resources in the first display region 160.

In step 560, the processor device 113 then performs the corresponding search for the related resources (associated with a resource identified by icon 410) based on the values for the filter parameters (as provided by the user 108).

In step 570, the processor device 113 displays the related resources, as a result of the search, on the display screen.

This overall process of automatically displaying the filter criteria in the filter window 175 when the number of resources selected to be displayed exceeds a threshold alleviates the user 108 from having to making the same determination by scrolling through an entire list of managed resources to identify which entries are important for viewing by the user 108.

Figure 6:
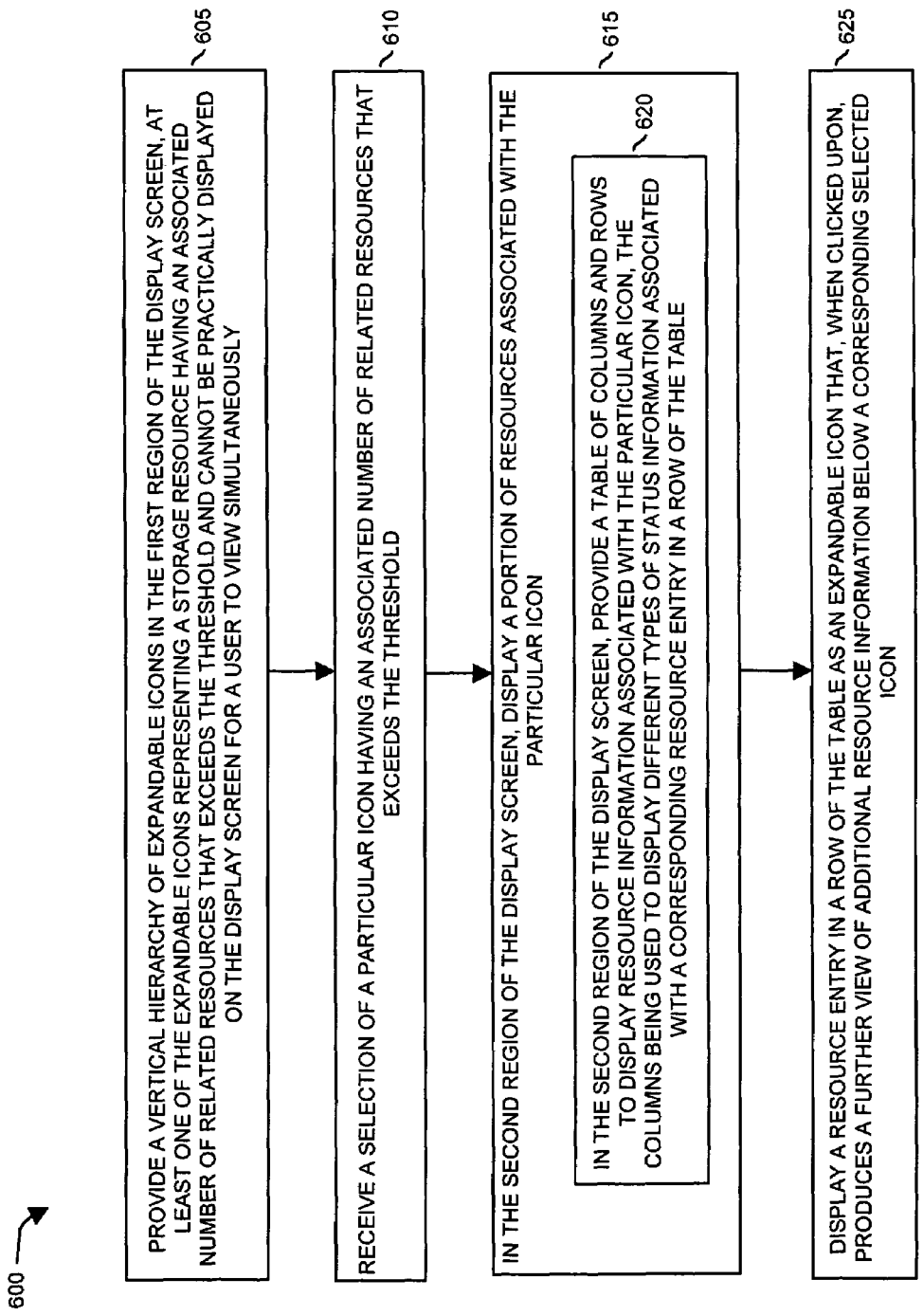
FIG. 6 is a flowchart illustrating another technique for viewing network resources according to an embodiment of the invention.

FIG. 6 is a flowchart 600 of processing steps performed by resource manager 120 according to an embodiment of the invention. Flowchart 600 more particularly illustrates a technique of enabling expansion of a hierarchical tree in table 178 according to an embodiment of the invention.

In step 605, the processor 113 provides a vertical hierarchy 165 of expandable icons in the first region 160 of the display screen 130. At least one of the expandable icons in the vertical hierarchy 165 represents a storage resource having an associated number of related resources that exceeds the threshold for displaying. Thus, the related resources or sub-resources associated with a selected entity (e.g., highlighted icon 410) cannot be practically displayed on the display screen 130 for a user 108 to view simultaneously.

In step 610, based on input such as a user 108 clicking on a corresponding icon 410 associated with a managed resource, the processor device receives a selection of a particular icon (e.g., icon 410) having an associated number of related resources that exceeds the threshold.

In step 620, in a second region 170 of the display screen 130, the processor 113 displays a portion of resources associated with the particular selected icon 410. For example, the processor device 113 provides a table of columns 440 and rows 430 to display resource information associated with the particular selected icon 410. The columns 440 of the table 178 display different types of status or configuration information associated with a corresponding resource entry in a row 430 of the table 178. That is, each column 440 supports displaying different types of information. Thus, a user 108 can view a particular resource entry in a column 440 of the table 178 and scan across a row 430 of the table 178 to view corresponding information associated with the particular resource entry.

In step 625, the processor device 113 displays a resource entry in a row 430 of the table 178 as an expandable icon that, when clicked upon, produces a further view of additional resource information below a corresponding selected icon in the row 430 of the table 178. In other words, a column 440 of the table 178 can include a set of expandable icons similar in respects to the vertical hierarchy of icons 165 in the first region 160 of the display screen 130. Note, however, an added feature of displaying the "expanded" information in the table 178 with many columns 440 enables a user 108 to see more information about newly displayed sub-resources in the table 178.

Figure 7:
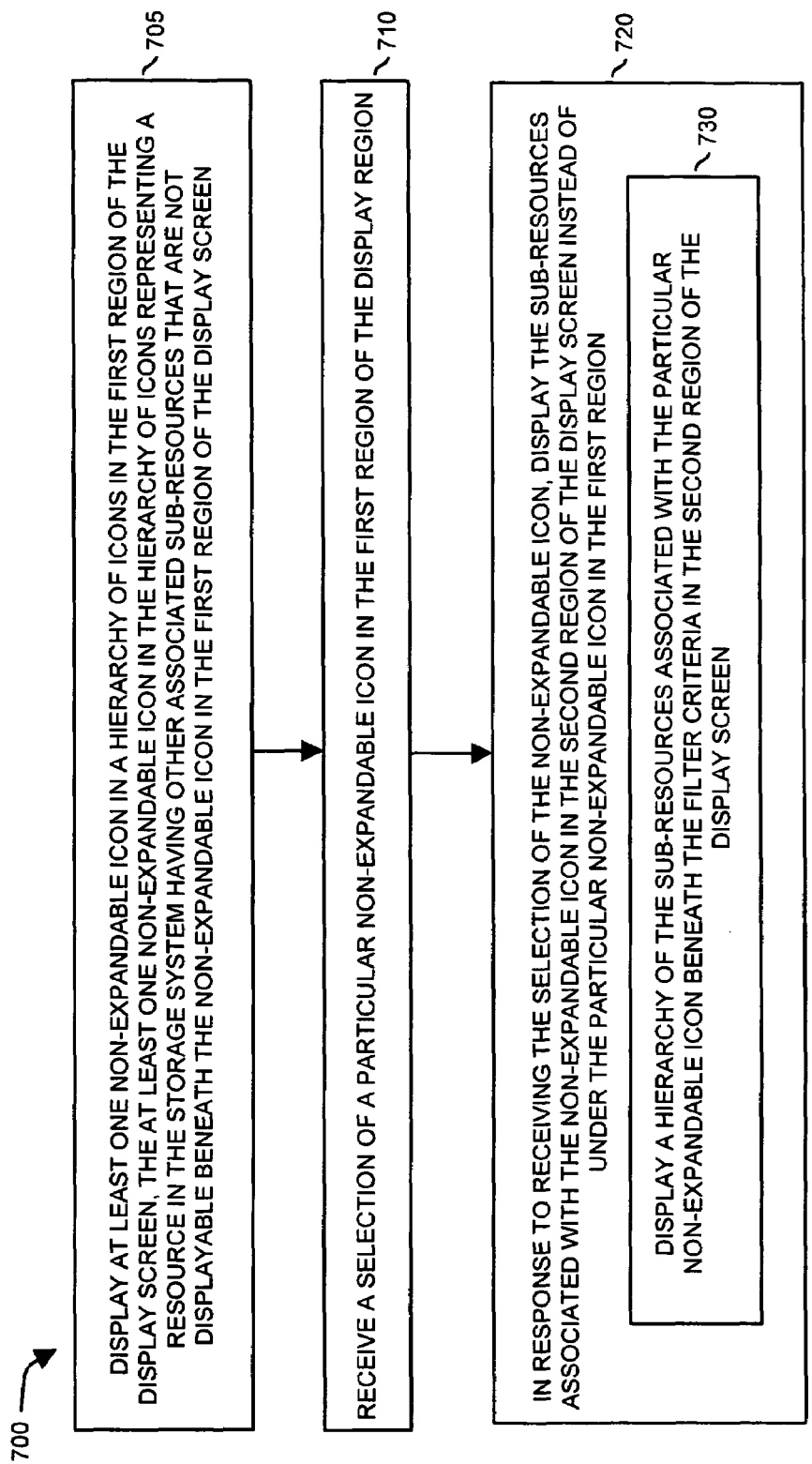
FIG. 7 is a flowchart illustrating another technique for viewing network resources according to an embodiment of the invention.

FIG. 7 is a flowchart 700 of processing steps performed by resource manager 120 according to an embodiment of the invention. Flowchart 700 more particularly illustrates a technique of utilizing non-expandable icons in the first region 160 of the display screen 130 according to an embodiment of the invention.

In step 705, processor 113 displays one or more non-expandable icons (e.g., an icon in the first region 160 of the display screen 130 that represents a folder of information or sub-resources that does not lend itself to viewing in the first region 160 of the display screen 130) in the hierarchy of icons 165 in the first region 160 of the display screen 130. Selection of the non-expandable icon prompts the processor device 113 to display sub-resources associated with the non-expandable icon in the second region 170 of the display screen 130 rather than beneath the selected non-expandable icon in the hierarchy of icons 165 in the first region 160 of the display screen 130. Thus, an embodiment of the invention is directed towards a processor device 113 that displays at least one non-expandable icon in a hierarchy of icons 165 in the first region 160 of the display screen 130, the at least one non-expandable icon in the hierarchy of icons 165 representing a resource in the storage system having other associated sub-resources that are not displayable beneath the non-expandable icon in the first region 160 of the display screen 130. Thus, a user 108 can view sub-resources associated with a selected resource in a different window than the originally selected resource. For example, user 108 selects icon 410 in a first display region 160 but views sub-resources in second display region 175. This renders it easier to view the sub-resources that would otherwise be difficult to view beneath a selected icon in the hierarchical tree 165 in the first region 170 of the display 130.

In step 710, based on input from a user 108, the processor device 113 receives a selection of a particular non-expandable icon in the first region 160 of the display region 130.

In step 720, in response to receiving the selection of the non-expandable icon, the processor device 113 displays the sub-resources associated with the non-expandable icon in the second region 170 of the display screen 130 instead of under the particular non-expandable icon in the first region 160.

In step 730, the processor device 730 displays a hierarchy of the sub-resources associated with the particular non-expandable icon in the table 178 beneath the filter criteria in the second region 170 of the display screen 130.

In some respects, therefore, a non-expandable icon in the first display region 160 is not locally expandable but is "expanded" remotely via generation of a table 178 of information in another window on the display screen 130 when the non-expandable icon is selected. Recall that a non-expandable icon represents a folder of resources that cannot be expanded in the first display region 160. Instead, sub-resources are displayed in the table 178.

Figure 8:
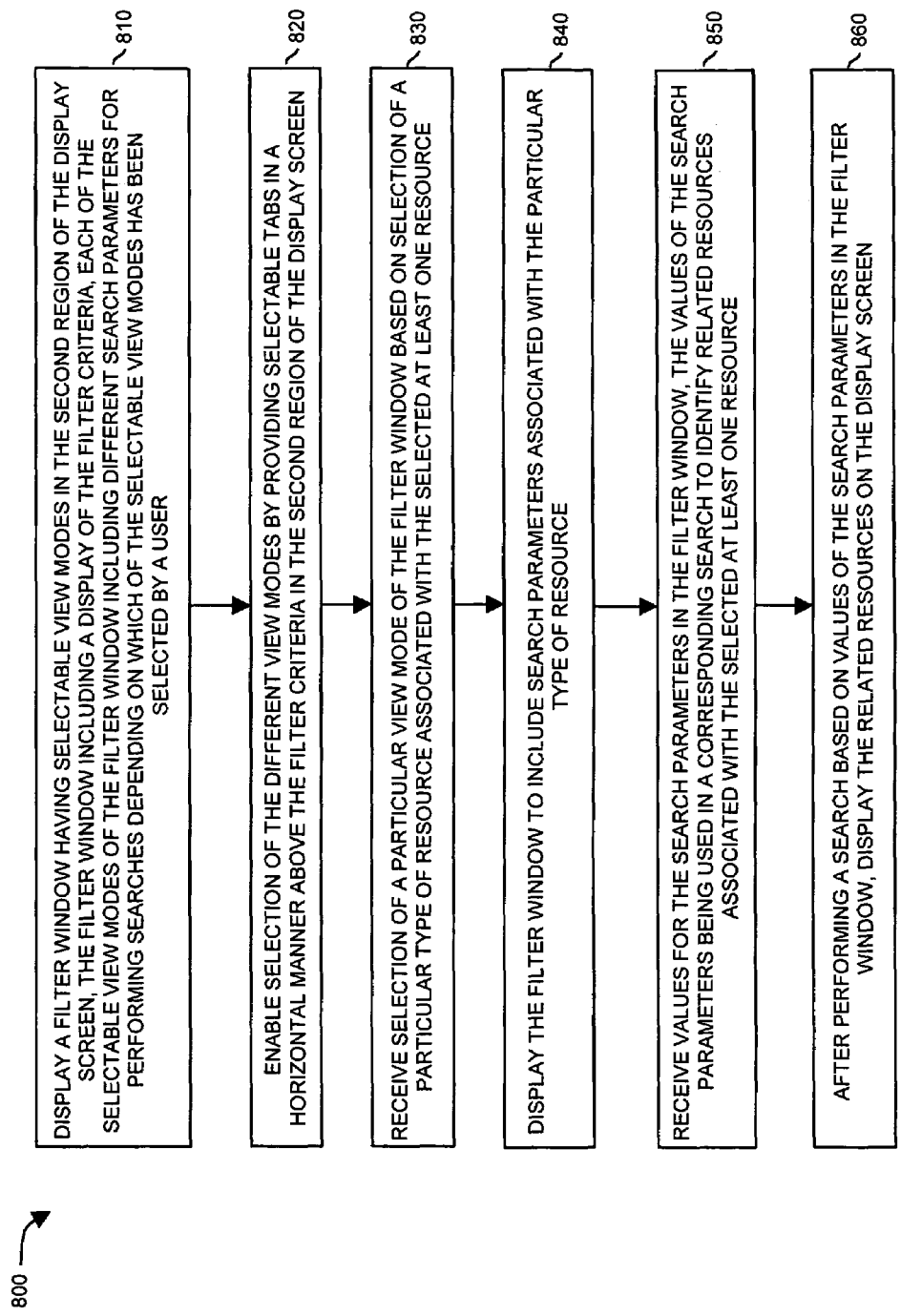
FIG. 8 is flowchart illustrating a more detailed technique for viewing network resources according to an embodiment of the invention.

FIG. 8 is a flowchart 800 of processing steps performed by resource manager 120 according to an embodiment of the invention. Flowchart 800 more particularly illustrates a technique of utilizing selectable view modes according to an embodiment of the invention.

In step 810, the processor 113 displays a filter window 175 having selectable view modes in the second region 170 of the display screen 130. The filter window 175 includes a display of filter criteria for limiting a view of displayed resources as discussed above as well as icons to select different view modes. Each of the selectable view modes of the filter window 175, when selected for viewing, includes different search parameters for performing searches depending on which of the selectable view modes has been selected by a user 108.

In step 820, processor 113 enables selection of the different view modes by providing selectable tabs 420 (e.g., in a horizontal manner) in relation to (e.g., above the filter criteria) the filter window 175 in the second region 170 of the display screen 130.

In step 830, based on input from a user 108, the processor 113 receives selection of a particular view mode of the filter window 175. Each of the different view modes may correspond to a particular type of resource associated with the selected one or more resources. For example, a first view mode may be selected based on selection of a first selectable icon 420-1 and corresponding type of resource to be viewed; a second view mode may be selected based on selection of a second selectable icon 420-2 and corresponding type of resource to be viewed, and so on.

In step 840, based on the selected view mode, the processor 113 displays the filter window 175 to include a display of filter criteria pertinent to the particular type of resource associated with the selected view mode. The user then provides values for the filter criteria in the filter window 175 for the particular selected view mode.

In step 850, the processor 113 receives the values for the search parameters supplied by user 108 in the filter window 175 to perform a search and identify related resources associated with the selected one or more resources (e.g., highlighted icon 410).

In step 860, after performing a search based on values of the search parameters in the filter window 175, the processor 113 displays the related resources from the search on the display screen 130 for viewing by the user 108.

Providing different view modes according to the above method enables a user to quickly provide parameter values to be used in a corresponding search and obtain viewing results.

FIG. 9 is a flowchart 900 of processing steps performed by resource manager 120 according to an embodiment of the invention. Flowchart 900 more particularly illustrates a technique of displaying additional information associated with the selectable tabs 420 according to an embodiment of the invention.

In step 910, the processor 113 displays a filter window 175 having selectable view modes in the second region 160 of the display screen 130. As discussed, the filter window 175 includes a display of the filter criteria for a user 108 to submit values to be used in a search.

In step 920, the processor 113 enables selection of the different view modes (associated with the filter window 175) by providing selectable tabs 420 (i.e., selectable icons) in the second region 170 of the display screen 130. In one embodiment, the selectable tabs 420 are disposed horizontally above the filter criteria in the filter window 175.

In step 930, the processor 113 generating the filter window 175 and corresponding selectable tabs 420 labels each of the selectable tabs in the filter window 175 with an identifier (e.g., "general," "host directors," "mapped devices," "unmapped devices," etc.). The identifier associated with a selectable tab 420 identifies a corresponding type of sub-resource associated with the selected one or more resources (e.g., highlighted icon 410). Presentation of the selectable tabs 420 enables a user 108 to further narrow which type of sub-resource associated with an initially selected resource in the first region 160 of the display screen 130 shall be expanded for viewing.

In step 940, in addition to labeling the selectable tabs 420, according to one embodiment, the processor 113 provides numerical values (as shown in parentheses) in relation to corresponding identifiers in the selectable tabs 420 to identify how many sub-resources are associated with a particular type of sub-resource related to the selected one or more resources. Consequently, a user 108 can quickly review the numerical values displayed on the selectable tabs 420 to identify how many sub-resources are associated with corresponding types of resources identified by a corresponding selectable tab 420.

In step 950, the processor 113 receives, from a user 108, selection of a particular view mode based on activation of one of the selectable tabs 420.

In step 960, in response to receiving selection of the particular view mode, the processor 113 displays the corresponding type of sub-resources associated with the selected one or more resources in the second region 170 of the display screen 130.

As discussed, techniques of the invention are well suited for use in applications in which a network manager manages a storage area network including many managed resources that are not easily displayed in an expandable hierarchal tree. However, it should be noted that embodiments of the invention are not limited to use in such applications as mentioned and, thus, embodiments of the invention are well suited for many other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for providing information associated with a storage system on a display screen, the method comprising steps of:

in a first region of the display screen, displaying icons representing resources in the storage system;

receiving a selection of at least one resource identified on the display screen;

identifying that there are multiple resources related to the selected at least one resource and that a quantity associated with the multiple resources exceeds a threshold;

in response to the identifying, displaying filter criteria in a second region of the display screen, the filter criteria enabling input of filter parameters to limit a subsequent display of resources related to the selected at least one resource;

displaying a filter window having selectable view modes in the second region of the display screen, the filter window including a display of the filter criteria;

enabling selection of the different view modes by providing selectable tabs in the second region of the display screen;

labeling each of the selectable tabs in the filter window with an identifier of a corresponding type of sub-resources associated with the selected at least one resource;

receiving, from a user, selection of a particular view mode based on activation of one of the selectable tabs; and in response to receiving selection of the particular view mode, displaying the corresponding type of sub-resources associated with the selected at least one resource in the second region of the display screen.

2. A method as in claim 1 further comprising:

receiving values for the filter parameters to be used in a corresponding search for related resources associated with the selected at least one resource;

performing the corresponding search for the related resources based on the values for the filter parameters; and displaying the related resources on the display screen.

3. A method as in claim 1, wherein displaying icons representing resources in the storage system includes providing a vertical hierarchy of expandable icons in the first region of the display screen, at least one of the expandable icons representing a storage resource having an associated number of related resources that exceeds the threshold and cannot be practically displayed on the display screen for a user to view simultaneously; and wherein receiving the selection includes receiving a selection of a particular icon having an associated number of related resources that exceeds the threshold, the method further comprising:

in the second region of the display screen, displaying a portion of resources associated with the particular icon.

4. A method as in claim 3, wherein displaying the portion of the resources associated with the particular icon includes:

in the second region of the display screen, providing a table of columns and rows to display resource information associated with the particular icon, the columns being used to display different types of status information associated with a corresponding resource entry in a row of the table.

5. A method as in claim 4 further comprising:
displaying a resource entry in a row of the table as an expandable icon that, when clicked upon, produces a further view of additional resource information below a corresponding selected icon.

6. A method as in claim 1, wherein displaying icons in the first region representing resources in the storage system includes:
displaying at least one non-expandable icon in a hierarchy of icons in the first region of the display screen, the at least one non-expandable icon in the hierarchy of icons representing a resource in the storage system having other associated sub-resources that are not displayable beneath the non-expandable icon in the first region of the display screen.

7. A method as in claim 6 further comprising:
receiving a selection of a particular non-expandable icon in the first region of the display region;
in response to receiving the selection of the non-expandable icon, displaying the sub-resources associated with the non-expandable icon in the second region of the display screen instead of under the particular non-expandable icon in the first region.

8. A method as in claim 7 wherein displaying the sub-resources includes:
displaying a hierarchy of the sub-resources associated with the particular non-expandable icon beneath the filter criteria in the second region of the display screen.

9. A method as in claim 1, wherein displaying the filter criteria includes:
displaying the filter criteria in a filter window displayed in the second region of the display screen, the filter window including a partial listing of resources associated with the at least one selected resource.

10. A method as in claim 1 further comprising:
displaying the filter window having selectable view modes in the second region of the display screen, the filter window including a display of the filter criteria, each of the selectable view modes of the filter window including different search parameters for performing searches depending on which of the selectable view modes has been selected by a user; and
enabling selection of the different view modes by providing selectable tabs in a horizontal manner above the filter criteria in the second region of the display screen.

11. A method as in claim 10 further comprising:
receiving selection of a particular view mode of the filter window based on selection of a particular type of resource associated with the selected at least one resource;
displaying the filter window to include search parameters associated with the particular type of resource;
receiving values for the search parameters in the filter window, the values of the search parameters being used in a corresponding search to identify related resources associated with the selected at least one resource;
after performing a search based on values of the search parameters in the filter window, displaying the related resources on the display screen.

12. A method as in claim 1 further comprising:
providing numerical values in relation to corresponding identifiers in the selectable tabs to identify how many sub-resources are associated with a particular type of sub-resource related to the selected at least one resource.

13. A method as in claim 1, wherein receiving a selection of at least one resource identified on the display screen includes:
receiving a selection of a first resource and a second resource displayed in the first region of the display screen;
identifying that sub-resources related to a combination of the first resource and the second resource exceed a threshold; and
displaying a partial list of the sub-resources related to the first resource and the second resource in relation to the filter criteria displayed in the second region of the display screen.

14. A method as in claim 1, wherein receiving the selection includes receiving a selection of a particular icon from the displayed icons, the particular icon representing a corresponding resource in the storage system;
and wherein identifying that resources related to the selected at least one resource exceeds a threshold includes identifying that the corresponding resource has a sufficiently high number of related resources that the number of related resources exceeds the threshold and that all of the related resources cannot be practically displayed on the display screen for simultaneous viewing by a user, the method further comprising:
in the second region of the display screen, displaying fewer than all of the related resources on the display screen for viewing by the user.

15. A method as in claim 14 further comprising:
based on input from the user, receiving values for the filter parameters;
performing a corresponding search with respect to the related resources based on the received values for the filter parameters to identify a subset of the related resources; and
displaying the subset of the related resources in the second region of the display screen.

16. A method as in claim 1, wherein receiving the selection of the at least one resource includes receiving selection of a given resource displayed on the display screen, the method further comprising:
in response to receiving the selection of the given resource, initiating a search to identify a set of resources related to the given resource; and
displaying at least a portion of the set of related resources on a display screen for viewing by a user.

17. A method as in claim 16 further comprising:
based on input from the user, receiving values for the filter parameters;
utilizing the filter parameters to reduce the set of related resources into a smaller subset of related resources; and
displaying at least a portion of the smaller subset of related resources on a display screen for viewing by the user.

18. A method as in claim 1 further comprising:
wherein identifying that the number of resources related to the selected at least one resource exceeds the threshold includes identifying that all of the resources related to the selected at least one resource cannot be displayed on the display screen for simultaneous viewing by a user.

19. A method as in claim 1 further comprising:
highlighting the selected at least one resource on the display screen to indicate which resources in the storage system have been selected; and displaying at least a portion of the resources related to the selected at least one resource.

20. A computer system for displaying management information associated with a storage area network, the computer system comprising:

a processor;

a memory unit that stores instructions associated with an application executed by the processor; and an interconnect coupling the processor and the memory unit, enabling the computer system to execute the application and perform operations of:

in a first region of a display screen, displaying icons representing resources in the storage area network;

receiving a selection of at least one resource identified on the display screen;

in response to identifying that a quantity of resources related to the selected at least one resource exceeds a threshold, displaying filter criteria in a second region of the display screen, the filter criteria enabling input of filter parameters to limit a subsequent display of resources related to the selected at least one resource;

receiving a selection of a first resource and a second resource displayed in the first region of the display screen;

identifying that sub-resources related to a combination of the first resource and the second resource exceed a threshold; and displaying a partial list of the sub-resources related to the first resource and the second resource in relation to the filter criteria displayed in the second region of the display screen.

21. A computer system as in claim 20 further supporting operations of:

receiving values for the filter parameters to be used in a corresponding search for related resources associated with the selected at least one resource;

performing the corresponding search for the related resources based on the values for the filter parameters; and displaying the related resources on the display screen.

22. A computer system as in claim 20, wherein displaying icons representing resources in the storage system includes providing a vertical hierarchy of expandable icons in the first region of the display screen, at least one of the expandable icons representing a storage resource having an associated number of related resources that exceeds the threshold and cannot be practically displayed on the display screen for a user to view simultaneously; and wherein receiving the selection includes receiving a selection of a particular icon having an associated number of related resources that exceeds the threshold, the computer system further supporting operations of:

in the second region of the display screen, displaying a portion of resources associated with the particular icon.

23. A computer system as in claim 22, wherein displaying the portion of the resources associated with the particular icon includes:

in the second region of the display screen, providing a table of columns and rows to display resource information associated with the particular icon, the columns being used to display different types of status information associated with a corresponding resource entry in a row of the table.

24. A computer system as in claim 23 further supporting operations of:

displaying a resource entry in a row of the table as an expandable icon that, when clicked upon, produces a further view of additional resource information below a corresponding selected icon.

25. A computer system as in claim 20, wherein displaying icons in the first region representing resources in the storage system includes:

displaying at least one non-expandable icon in a hierarchy of icons in the first region of the display screen, the at least one non-expandable icon in the hierarchy of icons representing a resource in the storage system having other associated sub-resources that are not displayable beneath the non-expandable icon in the first region of the display screen.

26. A computer system as in claim 25 further supporting operations of:

receiving a selection of a particular non-expandable icon in the first region of the display region;

in response to receiving the selection of the non-expandable icon, displaying the sub-resources associated with the non-expandable icon in the second region of the display screen instead of under the particular non-expandable icon in the first region.

27. A computer system as in claim 26, wherein displaying the sub-resources includes:

displaying a hierarchy of the sub-resources associated with the particular non-expandable icon beneath the filter criteria in the second region of the display screen.

28. A computer system as in claim 20, wherein displaying the filter criteria includes:

displaying the filter criteria in a filter window displayed in the second region of the display screen, the filter window including a partial listing of resources associated with the at least one selected resource.

29. A computer system as in claim 20 further supporting operations of:

displaying a filter window having selectable view modes in the second region of the display screen, the filter window including a display of the filter criteria, each of the selectable view modes of the filter window including different search parameters for performing searches depending on which of the selectable view modes has been selected by a user; and enabling selection of the different view modes by providing selectable tabs in a horizontal manner above the filter criteria in the second region of the display screen.

30. A computer system as in claim 29 further supporting operations of:

receiving selection of a particular view mode of the filter window based on selection of a particular type of resource associated with the selected at least one resource;

displaying the filter window to include search parameters associated with the particular type of resource;

receiving values for the search parameters in the filter window, the values of the search parameters being used in a corresponding search to identify related resources associated with the selected at least one resource;

after performing a search based on values of the search parameters in the filter window, displaying the related resources on the display screen.

31. A computer system as in claim 20 further supporting operations of:

displaying a filter window having selectable view modes in the second region of the display screen, the filter window including a display of the filter criteria; and enabling selection of the different view modes by providing selectable tabs in the second region of the display screen.

32. A computer system as in claim 31 further supporting operations of:
  labeling each of the selectable tabs in the filter window with an identifier of a corresponding type of sub-resources associated with the selected at least one resource;
  receiving, from a user, selection of a particular view mode based on activation of one of the selectable tabs; and
  in response to receiving selection of the particular view mode, displaying the corresponding type of sub-resources associated with the selected at least one resource in the second region of the display screen.

33. A computer system as in claim 32 further supporting operations of:
  providing numerical values in relation to corresponding identifiers in the selectable tabs to identify how many sub-resources are associated with a particular type of sub-resource related to the selected at least one resource.

34. A computer system for displaying management information associated with a storage area network, the computer system comprising:
  a processor;
  a memory unit that stores instructions associated with an application executed by the processor; and
  an interconnect coupling the processor and the memory unit, enabling the computer system to execute the application and perform operations of:
    in a first region of a display screen, displaying multiple icons representing corresponding managed resources associated with the storage area network;
    receiving an indication of a user selected icon from the multiple icons, the user selected icon representing a selected at least one managed resource displayed in the first region of the display screen; and
    in response to receiving the indication of the user selected icon, displaying a filter window having selectable view modes in a second region of the display screen, the filter window including multiple selectable tabs for selecting a corresponding view mode of the filter window and which type of resource associated with the selected at least one managed resource is to be filtered.

35. A method comprising:
  in a first region of the display screen, displaying icons representing resources in the storage system;
  receiving a selection of at least one resource identified on the display screen;
  identifying that there are multiple resources related to the selected at least one resource and that a quantity associated with the multiple resources exceeds a threshold; and
  in response to the identifying, displaying filter criteria in a second region of the display screen, the filter criteria enabling input of filter parameters to limit a subsequent display of resources related to the selected at least one resource;
  displaying a filter window having selectable view modes in the second region of the display screen, the filter window including a display of the filter criteria that changes depending on which of the selectable view modes has been selected; and
  enabling selection of the different view modes by providing selectable tabs in the second region of the display screen; and
  wherein identifying that resources related to the selected at least one resource exceeds a threshold includes identifying that the selected at least one resource has a sufficiently high number of related resources that the number of related resources exceeds the threshold and, because the number exceeds the threshold, that all of the related resources cannot be practically displayed on the display screen for simultaneous viewing by a user.

* * * * *